(12) United States Patent
Wang et al.

(10) Patent No.: US 10,009,832 B1
(45) Date of Patent: Jun. 26, 2018

(54) FACILITATING COMPACT SIGNALING DESIGN FOR RESERVED RESOURCE CONFIGURATION IN WIRELESS COMMUNICATION SYSTEMS

(71) Applicant: AT&T Intellectual Property I, L.P., Atlanta, GA (US)

(72) Inventors: Xiaoyi Wang, Austin, TX (US); Arunabha Ghosh, Austin, TX (US); Salam Akoum, Austin, TX (US); Ralf Bendlin, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

(21) Appl. No.: 15/675,339

(22) Filed: Aug. 11, 2017

(51) Int. Cl.
*H04L 27/28* (2006.01)
*H04W 48/12* (2009.01)
(Continued)

(52) U.S. Cl.
CPC .......... *H04W 48/12* (2013.01); *H04L 5/0007* (2013.01); *H04W 48/10* (2013.01); *H04W 74/006* (2013.01)

(58) Field of Classification Search
CPC ... H04W 48/12; H04W 48/10; H04W 74/006; H04L 5/0007
See application file for complete search history.

(56) References Cited

U.S. PATENT DOCUMENTS 6,522,660 B1 2/2003 Mukaihara et al.
8,116,262 B2 2/2012 Zhang et al.
(Continued)

FOREIGN PATENT DOCUMENTS

AU 2012202767 B2 1/2015
EP 3131225 A1 2/2017
(Continued)

OTHER PUBLICATIONS

De Andrade et al., "The Random Access Procedure in Long Term Evolution Networks for the Internet of Things," IEEE Communications Magazine, Mar. 2017, pp. 124-131, vol. 55, No. 3, 9 pages.
Fodor et al., "Architecture and Protocol Support for Radio Resource Management (RRM)," Long Term Evolution: 3GPP LTE Radio and Cellular Technology, Chapter 4, 2009, pp. 99-153, Taylor & Francis Group, LLC, 55 pages.
(Continued)

*Primary Examiner* — Jay P Patel
(74) *Attorney, Agent, or Firm* — Amin, Turocy & Watson, LLP

(57) ABSTRACT

A system facilitating compact signaling design for reserved resource configuration via a multi-dimensional bitmap is provided for a wireless communication system. A method comprises: determining a multi-dimensional bitmap (MDB) in time and frequency domains, wherein the time domain is represented by an orthogonal frequency division multiplexed (OFDM) symbol and the frequency domain is represented by an OFDM subcarrier. The determining comprises: selecting a group of reserved resource allocations of the MDB in which data information is not to be communicated; assigning a first value for the OFDM multiplexed symbol and the OFDM subcarrier according to a location of elements of the group of reserved resource allocations; and assigning, to other portions of the MDB other than the group of reserved resource allocations, a second value distinct from the first value. The method also comprises facilitating, by the device, transmitting the MDB to a mobile device.

20 Claims, 12 Drawing Sheets

(51) Int. Cl.
*H04W 48/10* (2009.01)
*H04W 74/00* (2009.01)
*H04L 5/00* (2006.01)

(56) References Cited

U.S. PATENT DOCUMENTS

| | | | | |
|---|---|---|---|---|
| 8,301,155 B2* | 10/2012 | Ho | .................. | H04W 72/042 |
| | | | | 370/338 |
| 8,750,932 B2 | 6/2014 | Zeira et al. | | |
| 9,094,167 B2 | 7/2015 | Zhang et al. | | |
| 9,100,664 B2 | 8/2015 | Ueda | | |
| 9,723,341 B2 | 8/2017 | Mun et al. | | |
| 2009/0168716 A1* | 7/2009 | Moon | .................. | H04W 72/04 |
| | | | | 370/329 |
| 2013/0094384 A1* | 4/2013 | Park | .................. | H04B 7/0626 |
| | | | | 370/252 |
| 2013/0194931 A1* | 8/2013 | Lee | .................. | H04L 5/0053 |
| | | | | 370/241 |
| 2013/0208604 A1* | 8/2013 | Lee | .................. | H04L 25/0226 |
| | | | | 370/252 |
| 2013/0315197 A1* | 11/2013 | Park | .................. | H04W 72/042 |
| | | | | 370/329 |
| 2015/0009944 A1* | 1/2015 | Li | .................. | H04W 72/082 |
| | | | | 370/329 |
| 2015/0341100 A1 | 11/2015 | Kwak et al. | | |
| 2016/0044619 A1 | 2/2016 | Ryu et al. | | |
| 2016/0234841 A1 | 8/2016 | Pao et al. | | |
| 2016/0248562 A1 | 8/2016 | Nam et al. | | |
| 2016/0295624 A1* | 10/2016 | Novlan | .................. | H04W 72/02 |
| 2017/0033899 A1 | 2/2017 | Rakib et al. | | |
| 2017/0078065 A1 | 3/2017 | Nam et al. | | |
| 2017/0141973 A1 | 5/2017 | Vrzic | | |
| 2017/0181055 A1* | 6/2017 | Wong | .................. | H04W 48/02 |
| 2017/0201363 A1 | 7/2017 | Son et al. | | |
| 2017/0223705 A1 | 8/2017 | Zhang et al. | | |
| 2017/0244535 A1* | 8/2017 | Islam | .................. | H04L 5/0058 |

FOREIGN PATENT DOCUMENTS

| | | |
|---|---|---|
| WO | 2017078785 A1 | 5/2017 |
| WO | 2017095305 A1 | 6/2017 |
| WO | 2017111857 A1 | 6/2017 |
| WO | 2017135668 A1 | 8/2017 |

OTHER PUBLICATIONS

Hossain et al., "Enhanced Random Access: Initial Access Load Balance in Highly Dense LTE-A Networks for Multiservice (H2H-MTC) Traffic," IEEE International Conference on Communications (ICC), 2017, 8 pages.

Rony et al., "Design Considerations for 5G Mobile Network," International Journal of Computer Applications, Jan. 2013, pp. 14-21, vol. 62, No. 10, 8 pages.

* cited by examiner

FACILITATING COMPACT SIGNALING DESIGN FOR RESERVED RESOURCE CONFIGURATION IN WIRELESS COMMUNICATION SYSTEMS

TECHNICAL FIELD

The subject disclosure relates generally to communications systems, and, for example, to systems, methods and/or machine-readable storage media for facilitating compact signaling design for reserved resource configuration via a multi-dimensional bitmap in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
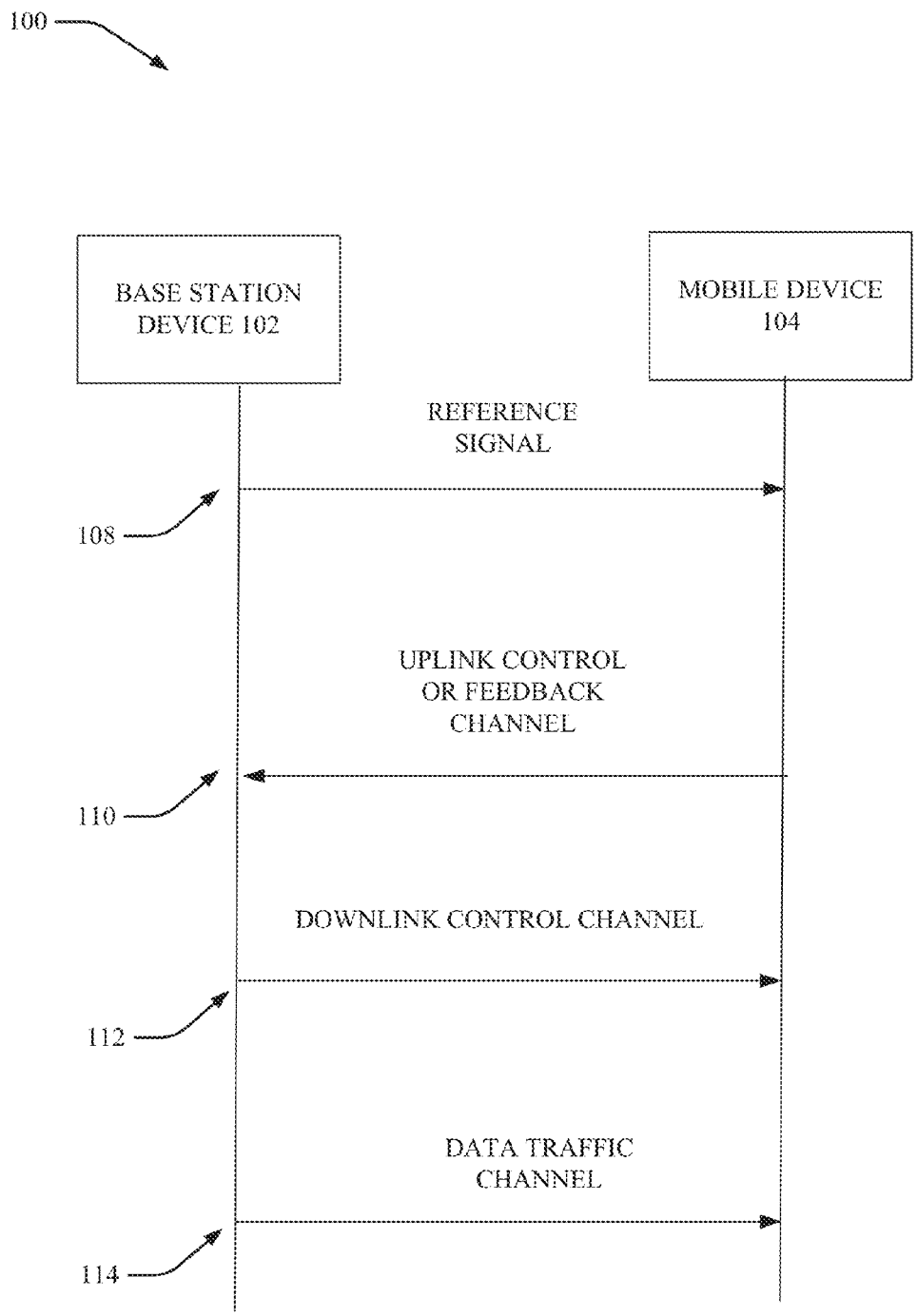
FIG. 1 illustrates an example, non-limiting message sequence flow chart to facilitate compact signaling design for reserved resource configuration via a multi-dimensional bitmap in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In traditional LTE Physical Downlink Shared Channel (PDSCH) RE mapping signaling, the LTE PDSCH resource element (RE) mapping scheme was designed to map around known signals and other channels. Correspondingly, the signaling was designed to indicate the configurations of those RS/channel so the mobile device can implicitly know the RE locations (e.g., the RE mapping pattern for a given parameter set is implicitly derived from the following parameters: crs-PortsCount-r11; crs-FreqShift-r11; mbsfn-SubframeConfigList-r11; csi-RS-ConfigZPId-r11; pdsch-Start-r11; qcl-CSI-RS-ConfigNZPId-r11; and zeroTxPowerCSI-RS2-r12.

It is foreseen that 5G can benefit from being optimized to fit a variety of traffic and services. Therefore, the first released NR should ideally be "future compatible". Forward compatibility can be facilitated by having the first released version of NR co-exist with future services efficiently. That is the motivation to introduce reserved resource in NR.

In general, a reserved resource is a high layer configured resource for the mobile device to avoid transmission and/or reception within. In the future, some new services are introduced in NR where some RS or data resource need to be introduced. In this case, the network can simply configure them as reserved resource to legacy mobile devices to avoid severe impact to those legacy mobile devices.

As the reserved resource is designed for future services, the LTE type of RE mapping signaling is not enough since the future RS is not known now. Therefore, the signaling must be flexible. However, some systems may disadvantageously utilize large signaling overhead, for each mobile device. For example, in some cases, per RE bitmap requires 12*14=168 bits for signaling.

New Radio (NR) will allow for semi-statically and/or reserved resources in both time and frequency domain to overcome the aforementioned shortcomings of LTE. One or more embodiments described herein can provide for approaches to configure reserved resources.

Systems, methods and/or machine-readable storage media for facilitating compact signaling via a multi-dimensional bitmap in a 5G wireless communication system are provided herein. One or more embodiments described herein can provide a compact signaling design for a reserved resource. For example, a multi-dimensional (e.g., two-dimensional) bitmap can be used as signaling to configure reserved resources in the granularity of one resource element (RE). The two-dimensional bitmap is constructed by overlaying two bitmaps separately (a first bitmap in the time domain and a second bitmap in the frequency domain).

Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (NR) access. Accordingly, systems, methods and/or machine-readable storage media for facilitating RE mapping for efficient use of the downlink control channel in a 5G wireless communication system are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

One or more embodiments described herein can include systems, apparatus, methods and/or machine-readable storage media that can facilitate compact signaling via a multi-dimensional bitmap in a 5G wireless communication system are provided herein. In one embodiment, an apparatus is provided. The apparatus can comprise: a processor; and a memory that stores executable instructions that, when executed by the processor, facilitate performance of operations. The operations can comprise: determining a multi-dimensional bitmap in a time domain and a frequency domain, wherein the time domain is represented by an orthogonal frequency division multiplexed symbol and the frequency domain is represented by an orthogonal frequency division multiplexed subcarrier. The determining comprises: selecting a group of reserved resource allocations of the multi-dimensional bitmap in which data information is not to be communicated; assigning, to the group of reserved resource allocations, a first value for the orthogonal frequency division multiplexed symbol of the multi-dimensional bitmap and the orthogonal frequency division multiplexed subcarrier of the multi-dimensional bitmap according to a location of elements of the group of reserved resource allocations; and assigning, to other portions of the multi-dimensional bitmap other than the group of reserved resource allocations, a second value distinct from the first value. The operations further comprise transmitting the multi-dimensional bitmap to a mobile device.

In another embodiment, a method is provided. The method comprises determining, by a device comprising a processor, a multi-dimensional bitmap in a time domain and a frequency domain, wherein the time domain is represented by an orthogonal frequency division multiplexed symbol and the frequency domain is represented by an orthogonal frequency division multiplexed subcarrier. The determining comprises: selecting a group of reserved resource allocations of the multi-dimensional bitmap in which data information is not to be communicated; assigning, to the group of reserved resource allocations, a first value for the orthogonal frequency division multiplexed symbol of the multi-dimensional bitmap and the orthogonal frequency division multiplexed subcarrier of the multi-dimensional bitmap according to a location of elements of the group of reserved resource allocations; and assigning, to other portions of the multi-dimensional bitmap other than the group of reserved resource allocations, a second value distinct from the first value. The method further comprises facilitating, by the device, transmitting the multi-dimensional bitmap to a mobile device.

In yet another embodiment, a machine-readable storage medium, comprising executable instructions that, when executed by a processor of an apparatus, facilitate performance of operations is provided. The operation comprise: receiving a multi-dimensional bitmap associated with orthogonal frequency division multiplexed symbols and orthogonal frequency division multiplexed subcarriers, wherein the multi-dimensional bitmap comprises: reserved resource allocations via which signaling information is to be communicated by the apparatus to a mobile device that receives the multi-dimensional bitmap and via which data information is not to be communicated from the apparatus, wherein the reserved resource allocations comprise a first value for selected ones of the orthogonal frequency division multiplexed symbols of the multi-dimensional bitmap and the orthogonal frequency division multiplexed subcarrier of the multi-dimensional bitmap. The operations further comprise receiving signaling information according to the reserved resource allocations of the multi-dimensional bitmap from the mobile device.

One or more embodiments can flexibly allow a two-dimensional bitmap signaling framework to support per RE level granularity. In addition, such two-dimensional bitmap will result in a symmetric pattern. For asymmetric RS design, this signaling framework may include some unnecessary REs; however, it is foreseen that the resource used for future service is most likely to be symmetric design. Additionally, one or more embodiments can have low overhead in comparison of 168 bits signaling overhead per mobile device, this solution only needs 12+14=26 bits for the signaling overhead per mobile device.

Figure 2:
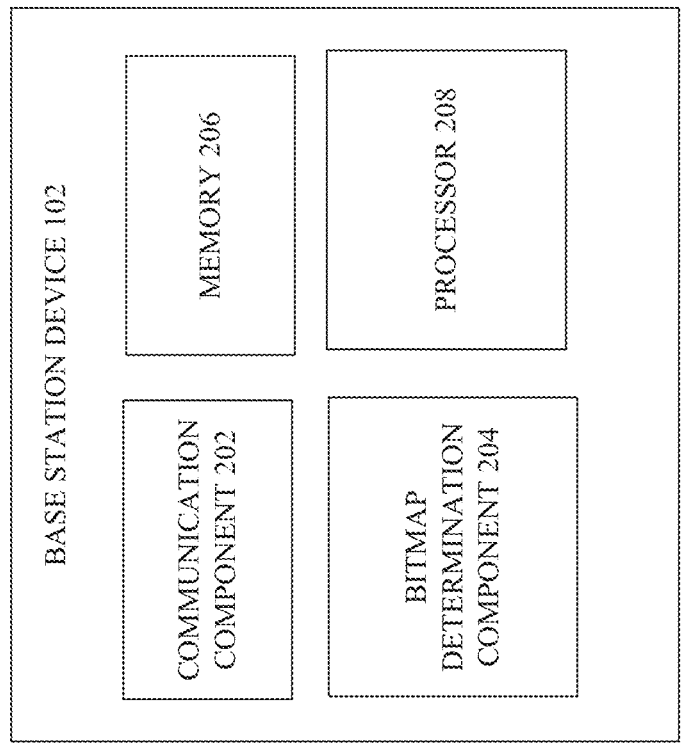
FIG. 2 illustrates an example, non-limiting block diagram of a base station device that can facilitate compact signaling design for reserved resource configuration via multi-dimensional bitmap in accordance with one or more embodiments described herein.
Figure 3:
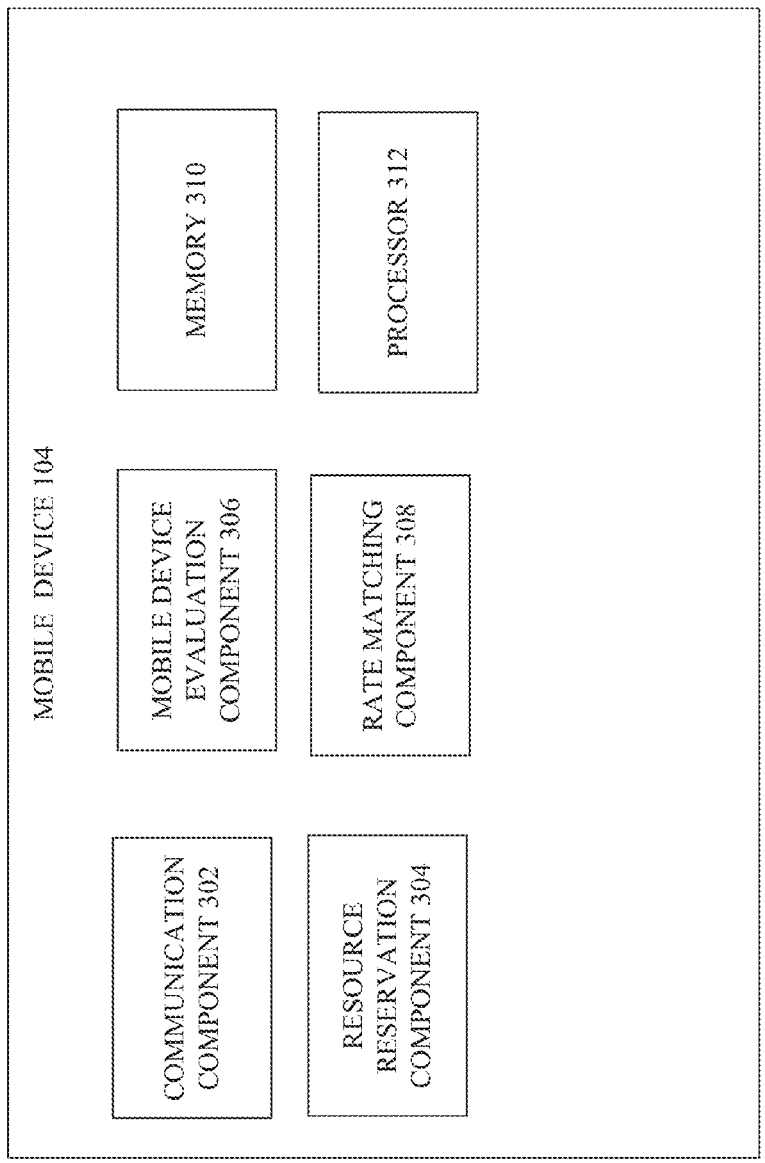
FIG. 3 illustrates an example, non-limiting block diagram of a mobile device for which compact signaling design for reserved resource configuration via a multi-dimensional bitmap can be facilitated in accordance with one or more embodiments described herein.
Figure 4:
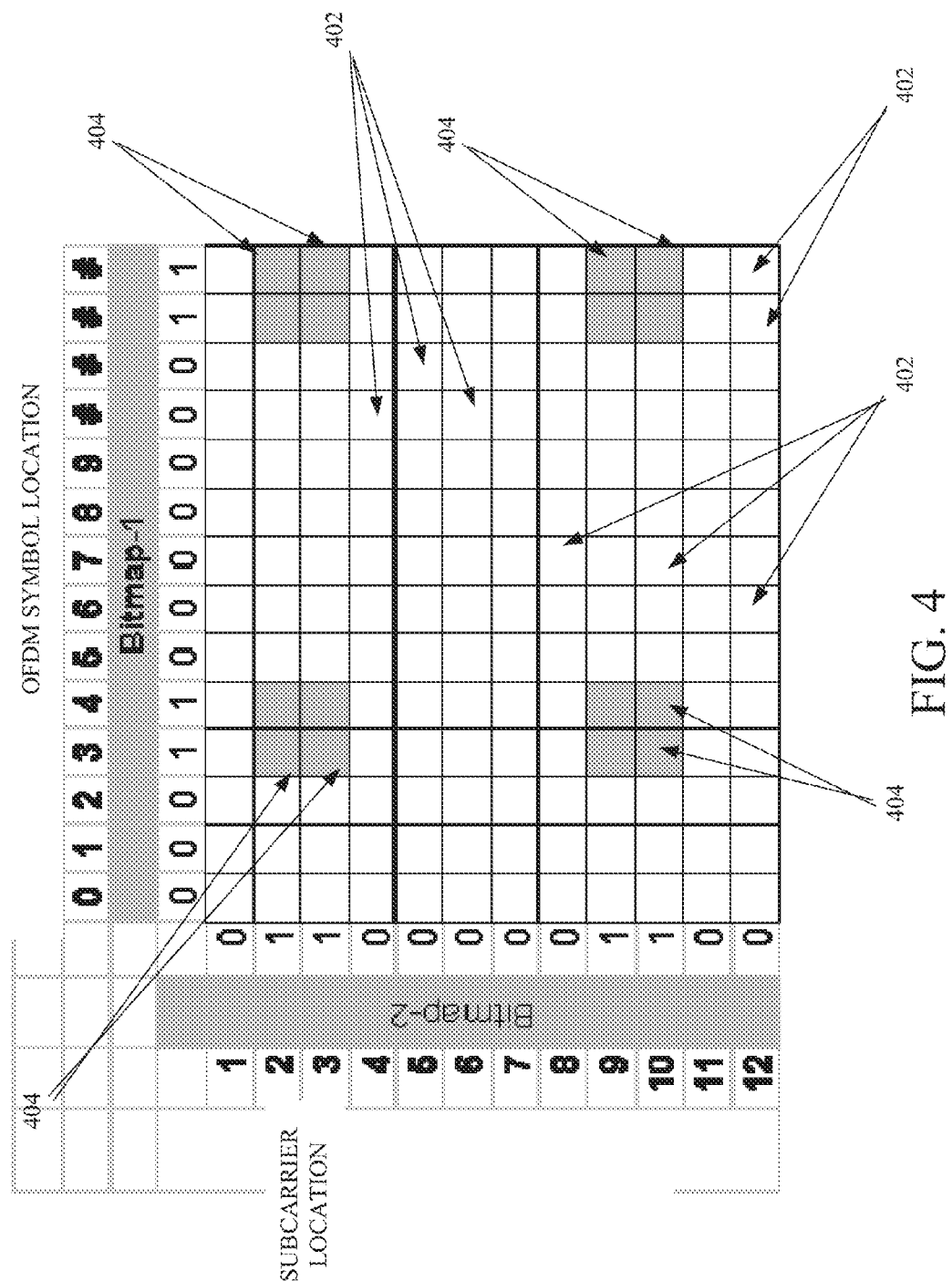
FIG. 4 illustrates an example, non-limiting multi-dimensional bitmap that can be employed to facilitate compact signaling design for reserved resource configuration in accordance with one or more embodiments described herein.

FIG. 1 illustrates an example, non-limiting message sequence flow chart to facilitate compact signaling design for reserved resource configuration via a multi-dimensional bitmap in accordance with one or more embodiments described herein. FIG. 2 illustrates an example, non-limiting block diagram of a base station device that can facilitate compact signaling design for reserved resource configuration via multi-dimensional bitmap in accordance with one or more embodiments described herein. FIG. 3 illustrates an example, non-limiting block diagram of a mobile device for which compact signaling design for reserved resource configuration via a multi-dimensional bitmap can be facilitated in accordance with one or more embodiments described herein. FIG. 4 illustrates an example, non-limiting multi-dimensional bitmap that can be employed to facilitate compact signaling design for reserved resource configuration in accordance with one or more embodiments described herein. Repetitive description of like elements employed in other embodiments described herein is omitted for sake of brevity.

The system 100 described herein can provide for a compact signaling design for the reserved resource via use of a multi-dimension (e.g., two-dimension) bitmap as signaling to configure reserved resource in the granularity of one RE. The two-dimensional bitmap is constructed by two bitmaps: in time and frequency domain separately.

One or more embodiments can enable the BS device 102 to dynamically signal the mobile device 104 to use specific REs located at particular OFDM symbol/OFDM subcarrier pairs in some embodiments as shown in FIG. 4 for signaling, for example. As used herein, dynamically signaling can mean signaling of information that can change from time to time.

In some embodiments described herein, the BS device 102 can transmit information to the mobile device 104 configuring resource reservation via a multi-dimensional mapping pattern. In one or more of the various embodiments described herein, this new signaling framework uses two bitmaps to construct the reserved resources, which is of much lower signaling overhead compared to a per RE level bitmap.

Turning back to FIG. 1, one or more of reference signals and/or pilot signals can be transmitted as shown at 108 of FIG. 1. The reference signals and/or the pilot signals can be beamformed or non-beamformed. The mobile device 104 can compute the channel estimates then determine the one or more parameters associated with channel state information (CSI) reporting. The CSI report can comprise example channel quality indicator (CQI), preceding matrix index (PMI), rank information (RI), the best subband indices, best beam indices etc. or any number of other types of information.

The CSI report can be sent from the mobile device 104 to the BS device via a feedback channel (e.g., feedback channel 110). The BS device 102 scheduler can use this information in choosing the parameters for scheduling of the particular mobile device 104. As used herein, the term "BS device 102" can be interchangeable with (or include) a network, a network controller or any number of other network components. The mobile device 104 can send the scheduling parameters to the mobile device 104 in the downlink control channel (e.g., downlink control channel 112). After this information is transmitted, the actual data transfer can be provided from the BS device 102 to the mobile device 104 over the data traffic channel 114.

The downlink control channel can carry information about the scheduling grants. As previously discussed, typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, as described in more detail with reference to FIGS. 2, 3 and 4, the downlink control channel can also carry data in one or more subcarriers of an OFDM control channel symbol at specific OFDM subcarriers to improve efficiency of the control channel.

Turning to FIG. 2, the base station device 102 can comprise a communication component 202, a bitmap determination component 204, memory 206 and/or processor 208. In some embodiments, the communication component 202, a bitmap determination component 204, memory 206 and/or processor 208 can be electrically and/or communicatively coupled to one another to perform one or more functions of the base station device.

Turning to FIG. 3, the mobile device 104 can comprise communication component 302, resource reservation component 304, mobile device evaluation component 306, rate matching component 308, memory 310 and/or processor 312. In some embodiments, one or more of communication component 302, resource reservation component 304, mobile device evaluation component 306, rate matching component 308, memory 310 and/or processor 312 can be electrically and/or communicatively coupled to one another to perform one or more functions of the mobile device 104.

With reference to FIGS. 2, 3 and 4, the bitmap determination component 204 of the base station device 102 can construct the multi-dimensional (e.g., two-dimensional) bitmap of FIG. 4 from two separate bitmaps. The two separate bitmaps can be a first bitmap associated with time and corresponding to OFDM symbol locations, and a second bitmap associated with frequency and corresponding to OFDM subcarrier locations. As shown in FIG. 4, the OFDM symbol location axis can be placed along a first axis and the OFDM subcarrier location axis can be placed along a second axis.

In constructing the multi-dimensional bitmap, for example, the bitmap determination component 204 can construct Bitmap-1 of FIG. 4 as $X_l$ where l is the index of OFDM symbol, and construct Bitmap-2 as $Y_k$ where k is the index of OFDM subcarrier. The final reserved resource mapping can be defined by the bitmap determination component 204b as $r_{k,l}=0$.

The bitmap determination component 204 can construct the multi-dimensional bitmap by overlaying the contents of the Bitmap-1 and Bitmap-2 as shown in FIG. 4. One RE corresponds to one OFDM symbol in time domain and one subcarrier/tone in frequency domain.

The bitmap determination component 204 can determine, for each of Bitmap-1 and Bitmap-2, which REs will have a value of "0" (meaning the mobile device can use the resource for data) or a value of "1" (meaning the resource is only to be used for signaling). As shown, the REs 404 that have a value of "1" for the OFDM symbol location and for the OFDM subcarrier location can be employed for signaling. Other REs (e.g., RE 402) can be employed for data.

Thus, the two bitmaps can cover a two-dimensional area. The bitmap determination component 204 can generate and/or determine the portions of the bitmap corresponding to REs 404. The portions of the bitmap corresponding to REs 404 are not to be used for PDCH transmission (the data is sent only to the other areas (e.g., REs 402). The signaling information is therefore limited to REs 404, which are the REs where the value of the OFDM symbol location and the value of the OFDM subcarrier are both assigned to value "1" by the bit determination component 202. While REs 404 are indicated by value "1" in some embodiments, they could be indicated by the REs where the value of the OFDM symbol location and the value of the OFDM subcarrier are both assigned to value "0" by the bit determination component 202 (while the other REs 402 are indicated by value "1"). All such embodiments are envisaged.

The mobile device evaluation component 306 can receive and/or transmit signaling information at REs 404 while receiving and/or transmitting data at REs 402. The rate matching component 308 can determine that, for the multi-dimensional bitmap (e.g., the multi-dimensional bitmap of FIG. 4), altogether, there are 168 REs with 16 of those REs being REs 404 (and that are therefore reserved for signaling). Accordingly, the rate matching component 308 can determine that the total available resource for data transmission and/or reception becomes 168−16=152 bits. As such, when the rate matching component 308 performs rate matching this means a decoder of the mobile device 104 can use different decoding rates to match the 152 bits. The two-dimensional bitmap of FIG. 4 can be employed by the rate matching component 308 and/or the decoder of the mobile device 104 as the input to the decoder to tell the decoder the decoding rate.

Accordingly, $(k,l) \in \{(k,l) | X_l * Y_k = 1\}$, where $X_l, Y_k$ are RRC signalling configured bitmaps configured by the bitmap determination component 202. As shown in FIG. 4, Bitmap-1 and Bitmap-2 are high layer configured bitmaps, and the reserved resource is defined according to both bitmaps. For a particular RE, the corresponding OFDM subcarrier and OFDM symbol index can map this RE to both bitmaps. If the bit in both bitmaps is 1, then the RE is considered as reserved resource.

The communication component 202 of the base station device 102 can transmit the multi-dimensional bitmap to the communication component 302 of the mobile device 104. The resource reservation component 304 of the mobile device 104 can determine the content of the multi-dimensional bitmap and the mobile device evaluation component 306 can determine whether to transmit and/or receive data and/or signaling based on the determination of the multi-dimensional bitmap made by the resource reservation component 304.

In some embodiments, any number of different arrangements of REs having values of "1" and "0" can be configured by the bitmap determination component 202 (and thus, the values at particular, OFDM symbol locations and OFDM subcarriers can be different than that shown in FIG. 4). Thus, the locations of REs 404 can differ in different embodiments.

In some embodiments, the bitmap determination component 202 can design the multi-dimensional bitmap such that there is symmetry design for REs (e.g., the REs 404 are symmetric with one another across the OFDM symbol locations and OFDM subcarriers).

The memory 206 can be a computer-readable storage medium storing computer-executable instructions and/or information configured to perform one or more of the functions described herein with reference to the base station device 102. For example, in some embodiments, the memory 206 can store computer-readable storage media associated with determining one or more bitmaps and/or the multi-dimensional bitmap. The processor 208 can perform one or more of the functions described herein with reference to the base station device 102.

The memory 310 can be a computer-readable storage medium storing computer-executable instructions and/or information configured to perform one or more of the functions described herein with reference to the mobile device 104. For example, in some embodiments, the memory 310 can store computer-readable storage media associated with determining the value of one or more REs of a multi-dimensional bitmap, determining whether to transmit and/or receive, performing rate matching etc. The processor 312 can perform one or more of the functions described herein with reference to the mobile device 104.

Figure 5:
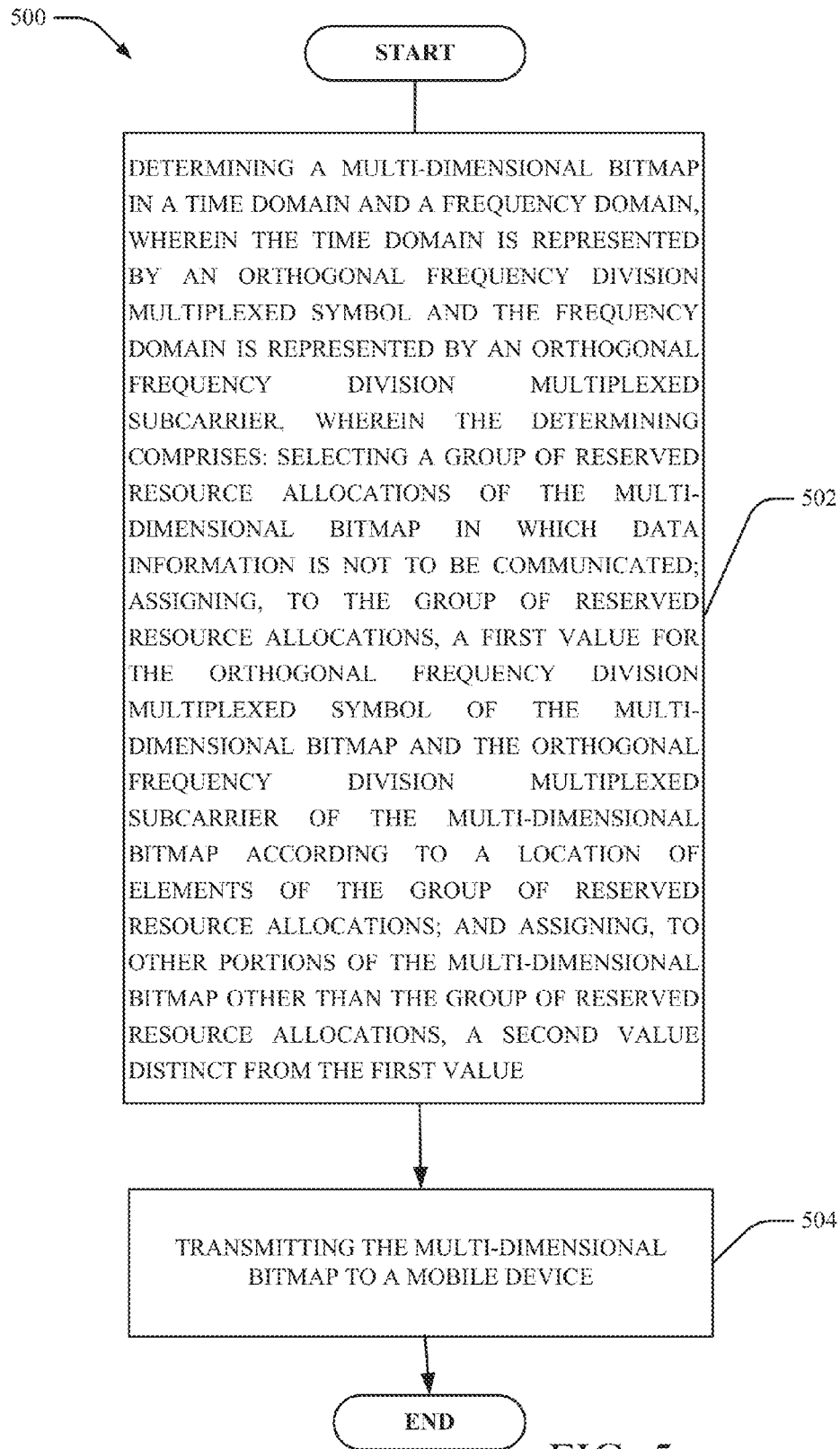
FIGS. 5, 6, 7, 8, 9, 10 and 11 illustrate flowcharts of methods that facilitate compact signaling design for reserved resource configuration in accordance with one or more embodiments described herein.

FIGS. 5, 6, 7, 8, 9, 10 and 11 illustrate flowcharts of methods that facilitate compact signaling design for reserved resource configuration in accordance with one or more embodiments described herein. Turning first to FIG. 5, at 504, method 500 can comprise determining a multi-dimensional bitmap in a time domain and a frequency domain, wherein the time domain is represented by an orthogonal frequency division multiplexed symbol and the frequency domain is represented by an orthogonal frequency division multiplexed subcarrier, wherein the determining comprises: selecting a group of reserved resource allocations of the multi-dimensional bitmap in which data information is not to be communicated; assigning, to the group of reserved resource allocations, a first value for the orthogonal frequency division multiplexed symbol of the multi-dimensional bitmap and the orthogonal frequency division multiplexed subcarrier of the multi-dimensional bitmap according to a location of elements of the group of reserved resource allocations; and assigning, to other portions of the multi-dimensional bitmap other than the group of reserved resource allocations, a second value distinct from the first value. At 506, method 500 can comprise transmitting the multi-dimensional bitmap to a mobile device. In some embodiments, the multi-dimensional bitmap comprises a two-dimensional bitmap.

In some embodiments, a reserved resource allocation of the group of reserved resource allocations is determined for one resource element of the multi-dimensional bitmap. In some embodiments, the first value is a "1" and the second value is a "0". In some embodiments, a total available reserved resource allocation for the signaling information is a first number of bits in a first bitmap (e.g., OFDM symbol bitmap) combined with a second number of bits in a second bitmap (e.g., OFDM subcarriers bitmap).

In some embodiments, the multi-dimensional bitmap in the time domain comprises a first single dimensional bitmap of the multi-dimensional bitmap. In some embodiments, the multi-dimensional bitmap in the frequency domain comprises a second single dimensional bitmap of the multi-dimensional bitmap.

Figure 6:
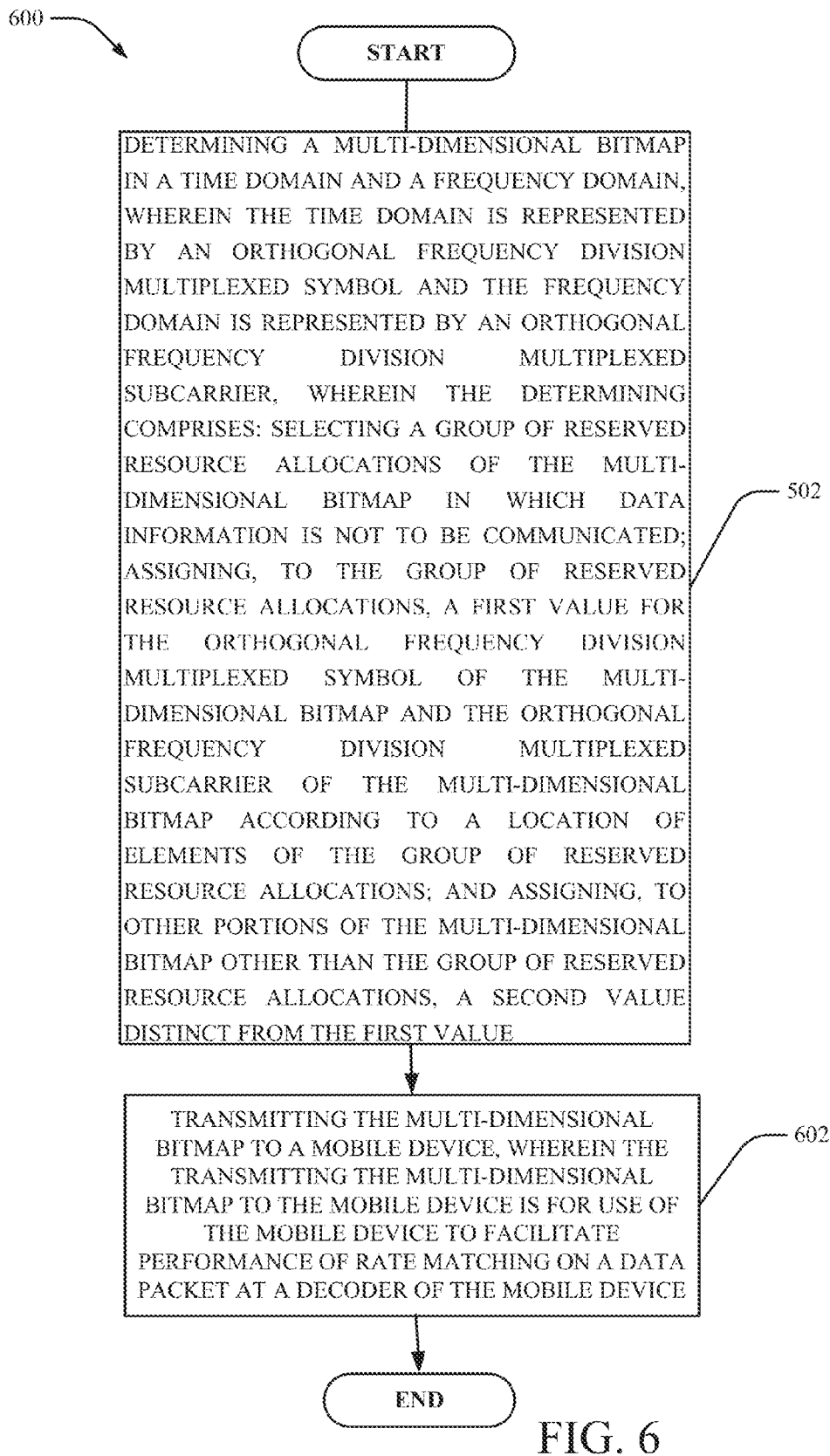

Turning to FIG. 6, the first step of method 600 can be 502 of method 500. At 602, method 600 can comprise transmitting the multi-dimensional bitmap to a mobile device, wherein the transmitting the multi-dimensional bitmap to the mobile device is for use of the mobile device to facilitate performance of rate matching on a data packet at a decoder of the mobile device.

Figure 7:
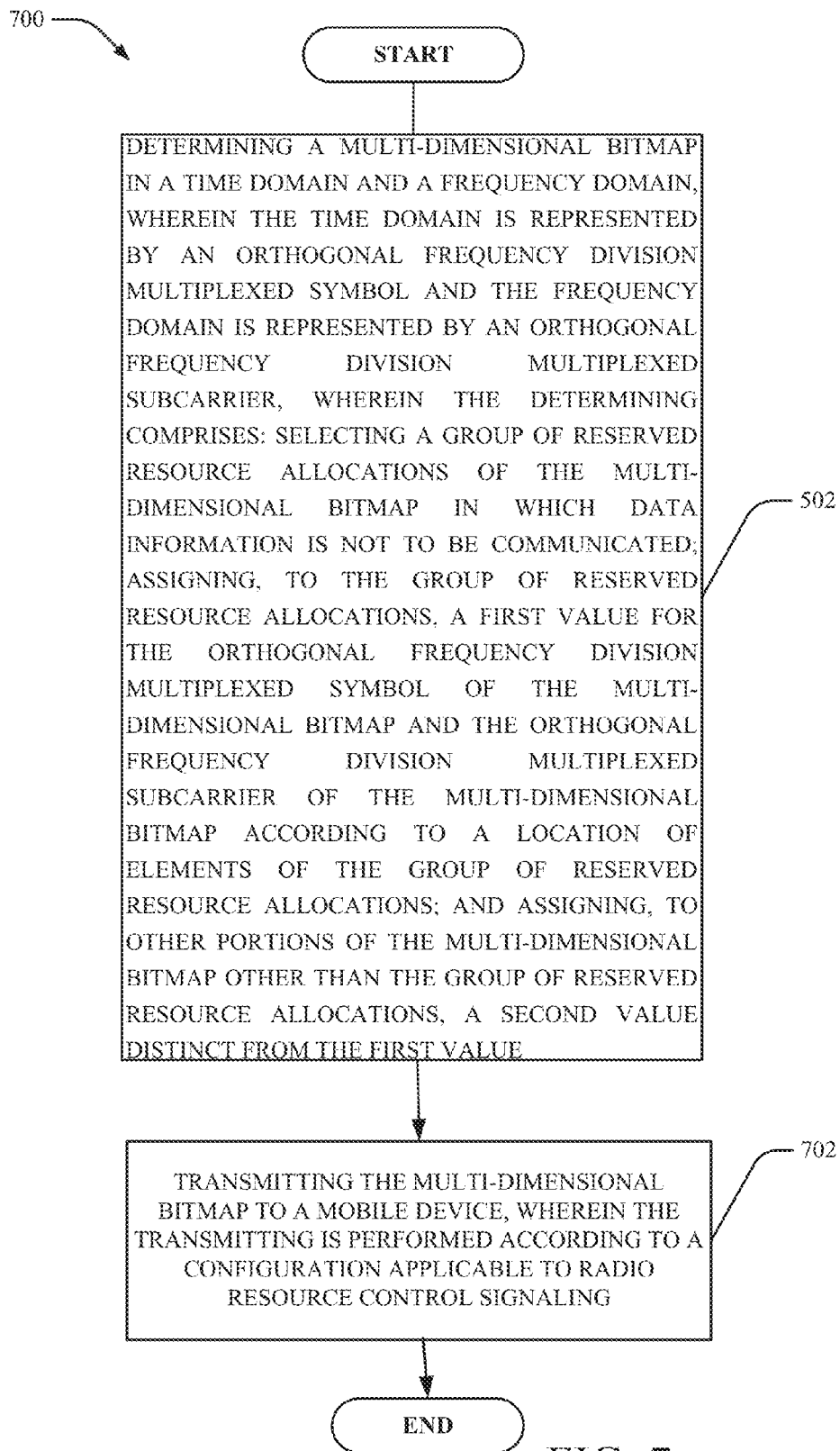

Turning to FIG. 7, the first step of method 700 can be 502 of method 500. At 702, method 600 can comprise transmitting the multi-dimensional bitmap to a mobile device, wherein the transmitting is performed according to a configuration applicable to radio resource control signaling.

Figure 8:
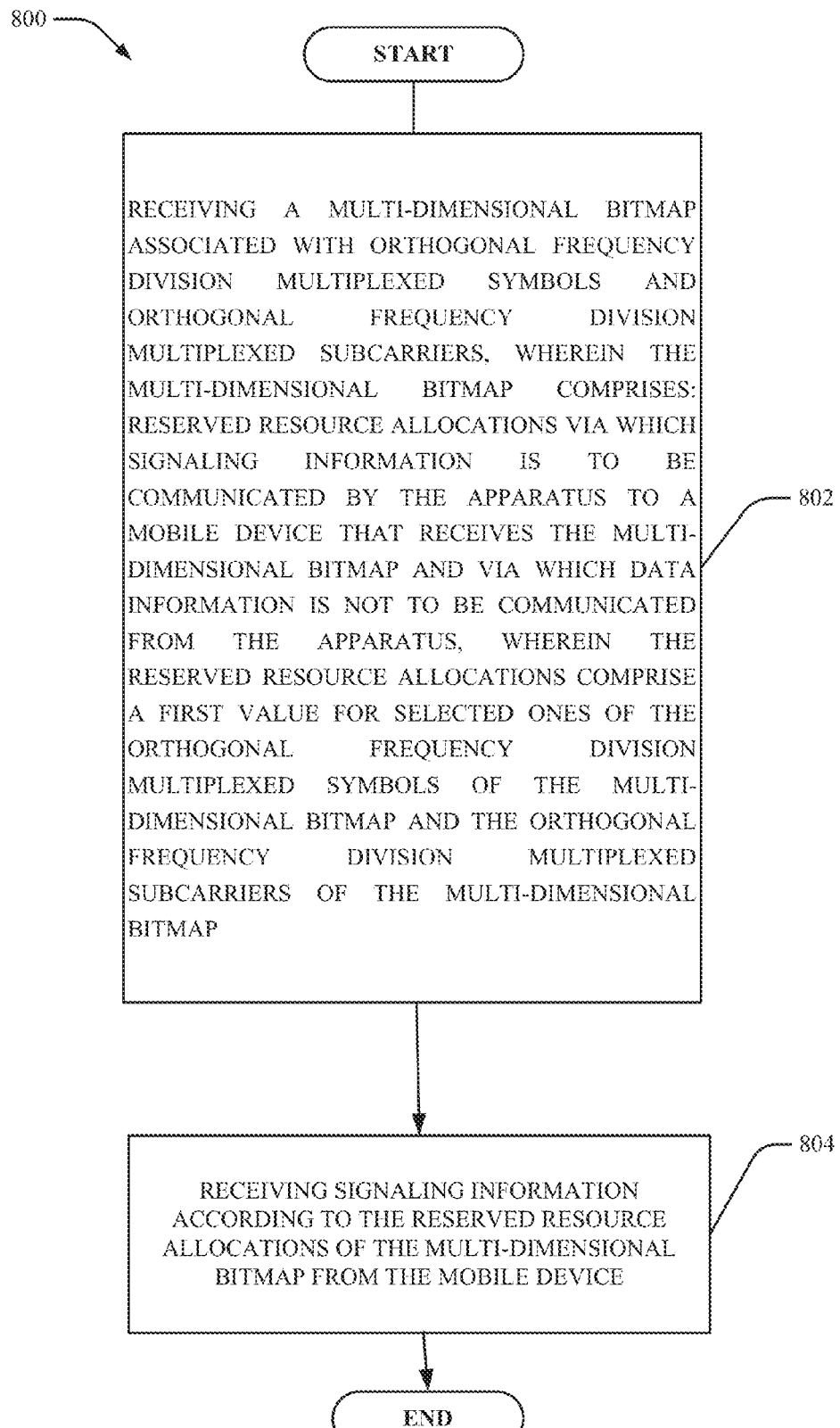

Turning now to FIG. 8, at 802, method 800 can comprise: receiving a multi-dimensional bitmap associated with orthogonal frequency division multiplexed symbols and orthogonal frequency division multiplexed subcarriers, wherein the multi-dimensional bitmap comprises: reserved resource allocations via which signaling information is to be communicated by the apparatus to a mobile device that receives the multi-dimensional bitmap and via which data information is not to be communicated from the apparatus, wherein the reserved resource allocations comprise a first value for selected ones of the orthogonal frequency division multiplexed symbols of the multi-dimensional bitmap and the orthogonal frequency division multiplexed subcarrier of the multi-dimensional bitmap. At 804, method 800 can comprise receiving signaling information according to the reserved resource allocations of the multi-dimensional bitmap from the mobile device. In some embodiments, the multi-dimensional bitmap comprises a two-dimensional bitmap.

Figure 9:
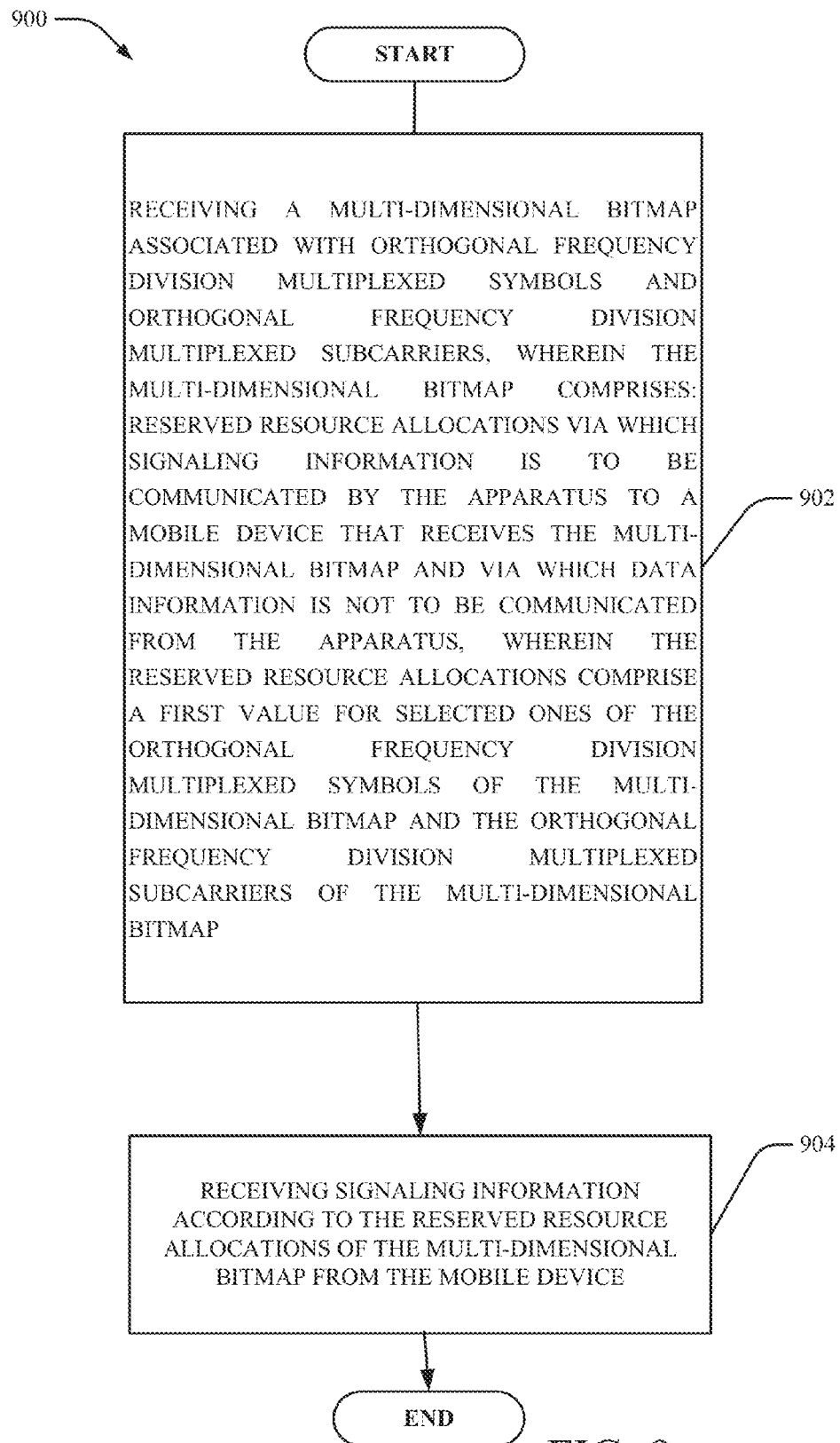

Turning now to FIG. 9, at 902, method 900 can comprise receiving a multi-dimensional bitmap associated with orthogonal frequency division multiplexed symbols and orthogonal frequency division multiplexed subcarriers, wherein the multi-dimensional bitmap comprises: reserved resource allocations via which signaling information is to be communicated by the apparatus to a mobile device that receives the multi-dimensional bitmap and via which data information is not to be communicated from the apparatus, wherein the reserved resource allocations comprise a first value for selected ones of the orthogonal frequency division multiplexed symbols of the multi-dimensional bitmap and the orthogonal frequency division multiplexed subcarrier of the multi-dimensional bitmap. At 904, method 900 can comprise receiving signaling information according to the reserved resource allocations of the multi-dimensional bitmap from the mobile device.

Figure 10:
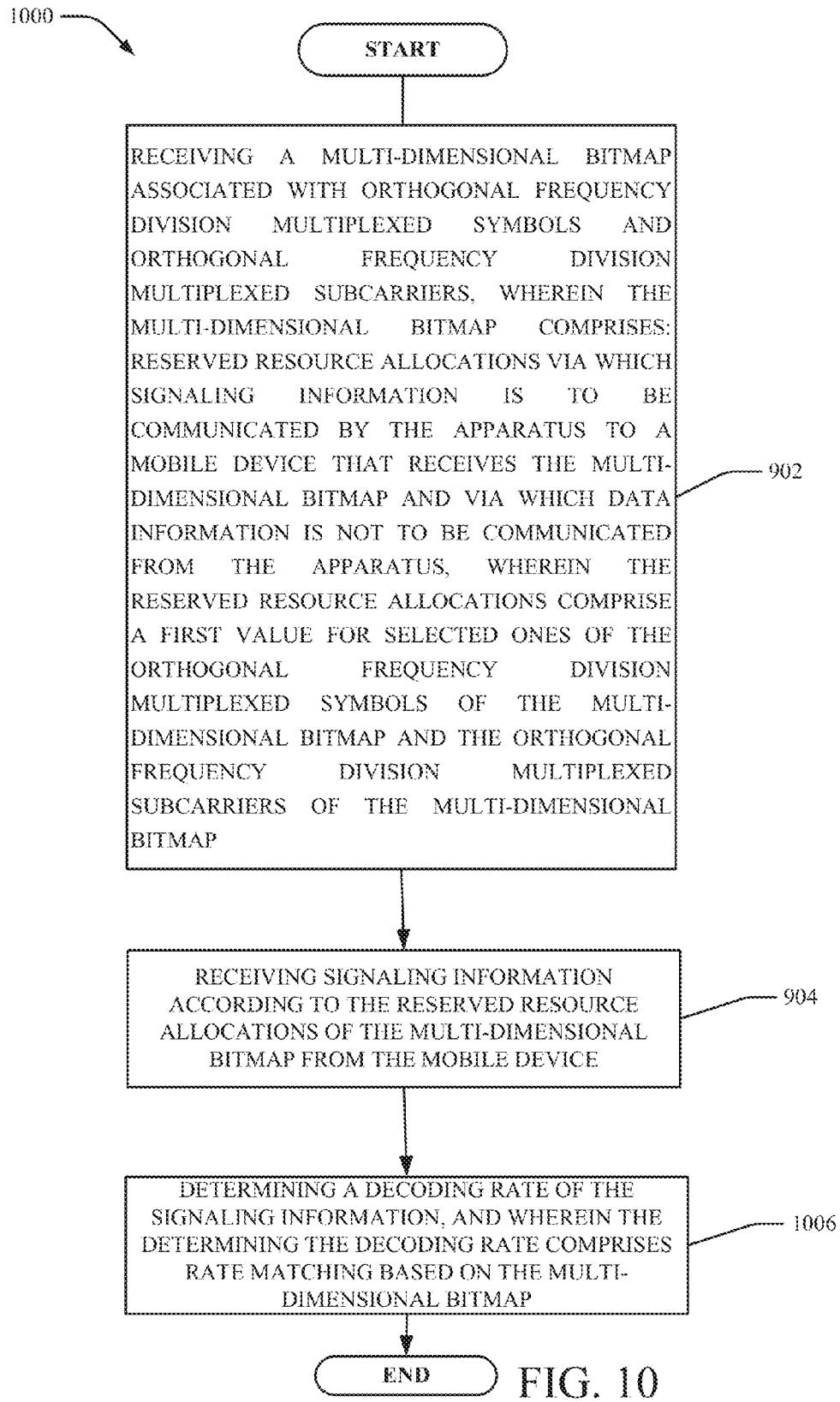

Turning now to FIG. 10, the first two steps of method 1000 can comprise 902 and 904 of method 900. At 1002, method 1000 can comprise determining a decoding rate of the signaling information, and wherein the determining the decoding rate comprises rate matching based on the multi-dimensional bitmap.

Figure 11:
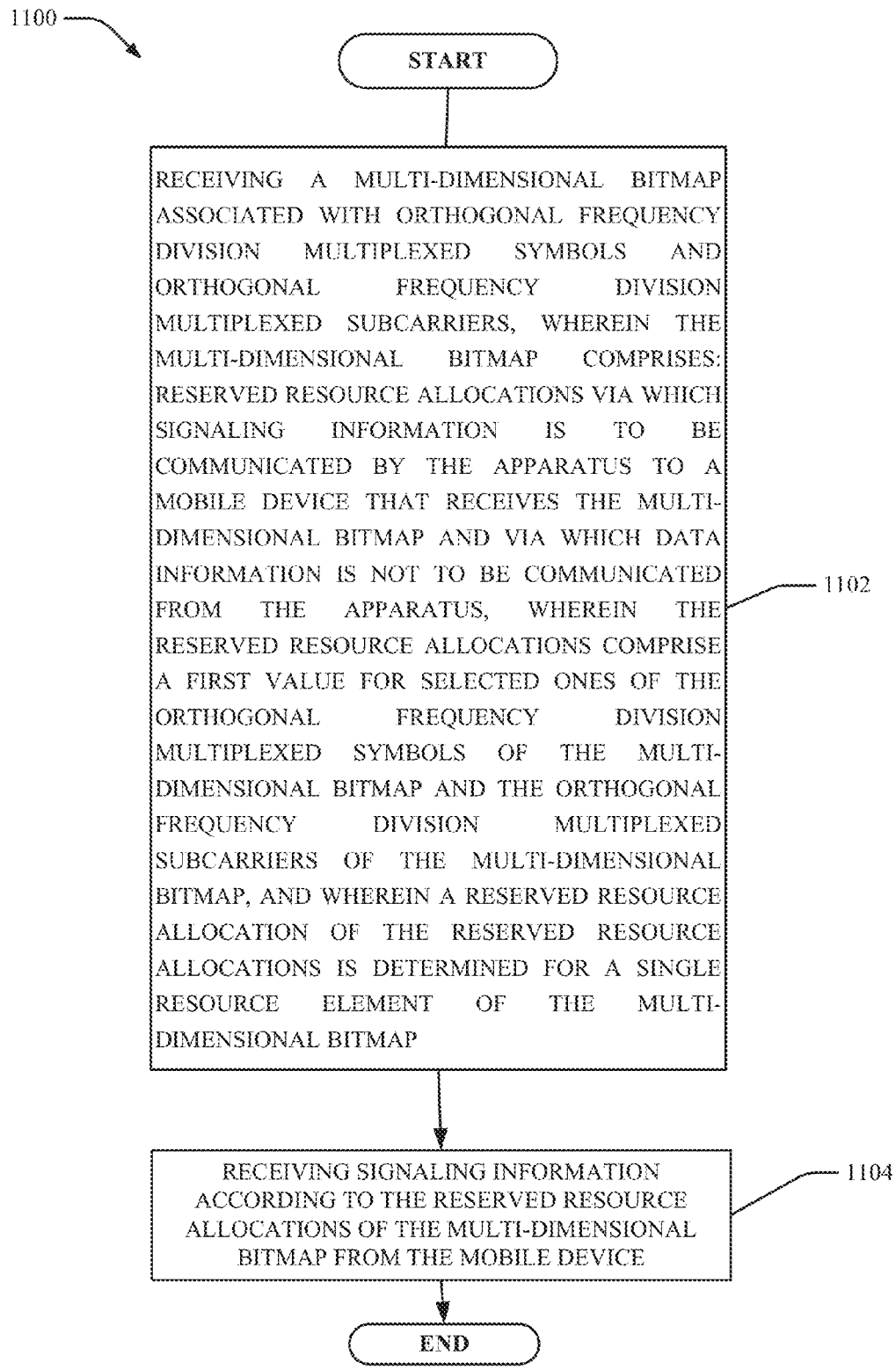

Turning now to FIG. 11, at 1102, method 1100 can comprise determining a decoding rate of the signaling information, and wherein the determining the decoding rate comprises rate matching based on the multi-dimensional bitmap. At 1104, method 1100 can comprise receiving signaling information according to the reserved resource allocations of the multi-dimensional bitmap from the mobile device.

Figure 12:
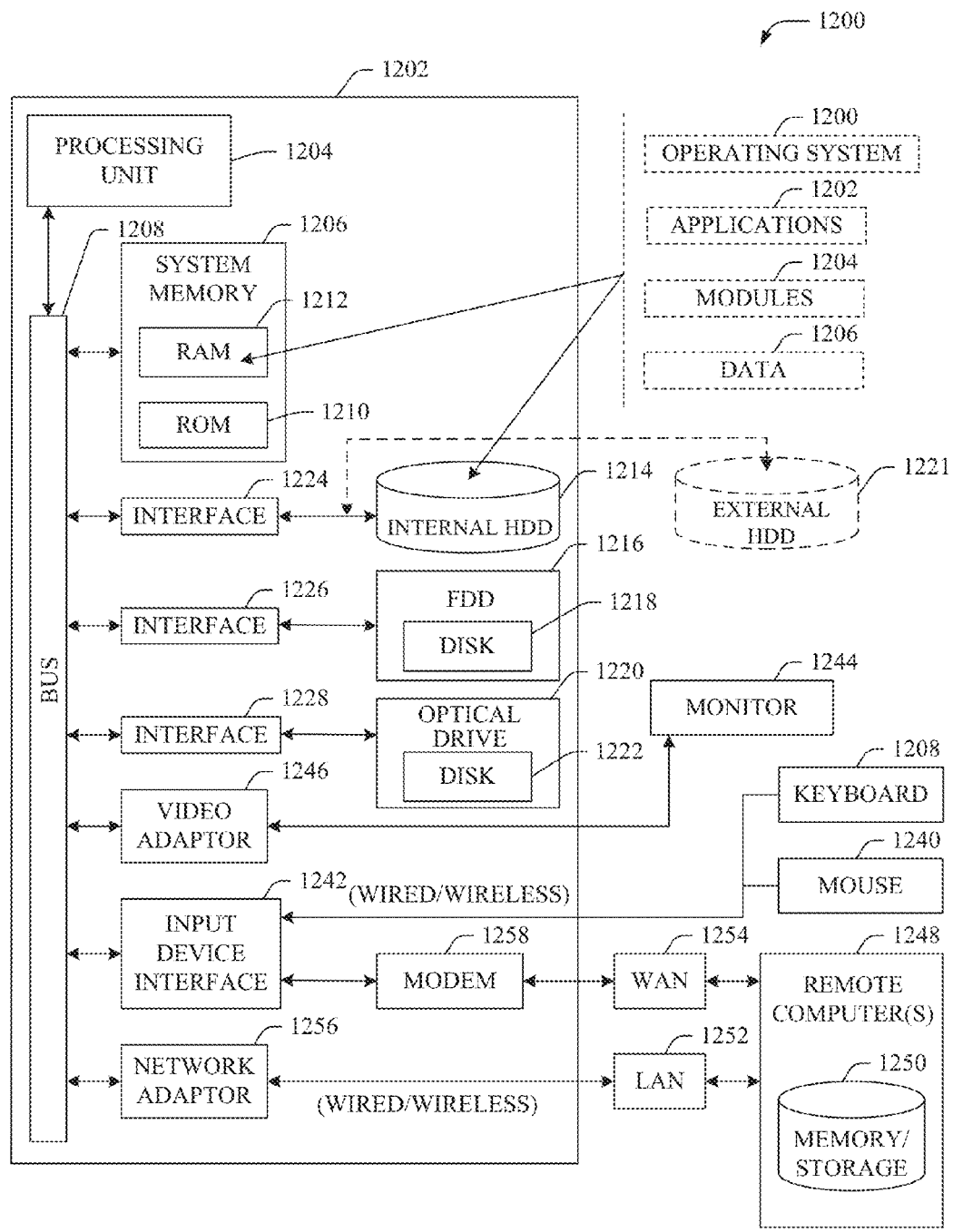
FIG. 12 illustrates a block diagram of a computer that can be employed in accordance with one or more embodiments described herein.

FIG. 12 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various embodiments of the embodiments described herein comprises a computer 1202, the computer 1202 comprising a processing unit 1204, a system memory 1206 and a system bus 1208. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1210 (e.g., EIDE, SATA), which internal hard disk drive 1214 can also be configured for external use in a suitable chassis (not shown), a magnetic floppy disk drive 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1202, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A communication device can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 12 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
  a processor; and
  a memory that stores executable instructions that, when executed by the processor, facilitate performance of operations, comprising:
    determining a multi-dimensional bitmap in a time domain and a frequency domain, wherein the time domain is represented by an orthogonal frequency division multiplexed symbol and the frequency domain is represented by an orthogonal frequency division multiplexed subcarrier, wherein the determining comprises:
      selecting a group of reserved resource allocations of the multi-dimensional bitmap in which data information is not to be communicated and in which signaling information is to be communicated;
      assigning, to the group of reserved resource allocations, a first value for the orthogonal frequency division multiplexed symbol of the multi-dimensional bitmap and the orthogonal frequency division multiplexed subcarrier of the multi-dimensional bitmap according to a location of elements of the group of reserved resource allocations; and
      assigning, to other portions of the multi-dimensional bitmap other than the group of reserved resource allocations, a second value distinct from the first value, wherein a total available reserved resource allocation for the signaling information is a first number of bits in a first bitmap of the multi-dimensional bitmap combined with a second number of bits in a second bitmap of the multi-dimensional bitmap; and
    transmitting the multi-dimensional bitmap to a mobile device.

2. The apparatus of claim 1, wherein the transmitting the multi-dimensional bitmap to the mobile device is for use of the mobile device to facilitate performance of rate matching.

3. The apparatus of claim 1, wherein the transmitting is performed according to a configuration applicable to radio resource control signaling.

4. The apparatus of claim 1, wherein a reserved resource allocation of the group of reserved resource allocations is determined for one resource element of the multi-dimensional bitmap.

5. The apparatus of claim 1, wherein the first value is a "1" and the second value is a "0".

6. The apparatus of claim 1, wherein the multi-dimensional bitmap in the time domain comprises a first single dimensional bitmap of the multi-dimensional bitmap.

7. The apparatus of claim 6, wherein the multi-dimensional bitmap in the frequency domain comprises a second single dimensional bitmap of the multi-dimensional bitmap.

8. A method, comprising:
  determining, by a device comprising a processor, a multi-dimensional bitmap in a time domain and a frequency domain, wherein the time domain is represented by an orthogonal frequency division multiplexed symbol and the frequency domain is represented by an orthogonal frequency division multiplexed subcarrier, wherein the determining comprises:
    selecting a group of reserved resource allocations of the multi-dimensional bitmap in which data information is not to be communicated;
    assigning, to the group of reserved resource allocations, a first value for the orthogonal frequency division multiplexed symbol of the multi-dimensional bitmap and the orthogonal frequency division multiplexed subcarrier of the multi-dimensional bitmap according to a location of elements of the group of reserved resource allocations; and
    assigning, to other portions of the multi-dimensional bitmap other than the group of reserved resource allocations, a second value distinct from the first value, wherein a total available reserved resource allocation for signaling information is a first number of bits in a first bitmap combined with a second number of bits in a second bitmap; and
  facilitating, by the device, transmitting the multi-dimensional bitmap to a mobile device.

9. The method of claim 8, wherein the facilitating the transmitting the multi-dimensional bitmap to the mobile device facilitates rate matching on a data packet at a decoder of the mobile device.

10. The method of claim 9, wherein the facilitating the transmitting is performed according to a configuration applicable to radio resource control signaling.

11. The method of claim 8, wherein a reserved resource allocation of the group of reserved resource allocations is determined for one resource element of the multi-dimensional bitmap.

12. The method of claim 8, wherein the first value is a one and the second value is a zero.

13. The method of claim 8, wherein the multi-dimensional bitmap in the time domain is represented by a first single dimensional bitmap of the multi-dimensional bitmap.

14. The method of claim 13, wherein the multi-dimensional bitmap in the frequency domain is represented by a second single dimensional bitmap of the multi-dimensional bitmap.

15. A non-transitory machine-readable storage medium, comprising executable instructions that, when executed by a processor of an apparatus, facilitate performance of operations, comprising:
  receiving a multi-dimensional bitmap associated with orthogonal frequency division multiplexed symbols and orthogonal frequency division multiplexed subcarriers, wherein the multi-dimensional bitmap comprises:
    a first bitmap comprising a first number of bits,
    a second bitmap comprising a second number of bits, and
    reserved resource allocations via which signaling information is to be communicated by the apparatus to a mobile device that receives the multi-dimensional bitmap and via which data information is not to be communicated from the apparatus, wherein a total available reserved resource allocation for the signaling information is the first number of bits combined with the second number of bits, wherein the reserved resource allocations comprise a first value for selected ones of the orthogonal frequency division multiplexed symbols of the multi-dimensional bitmap and the orthogonal frequency division multiplexed subcarriers of the multi-dimensional bitmap; and
  receiving signaling information according to the reserved resource allocations of the multi-dimensional bitmap from the mobile device.

16. The non-transitory machine-readable storage medium of claim 15, wherein the operations further comprise:
  determining a decoding rate of the signaling information.

17. The non-transitory machine-readable storage medium of claim 15, wherein a reserved resource allocation of the reserved resource allocations is determined for a single resource element of the multi-dimensional bitmap.

18. The non-transitory machine-readable storage medium of claim 15, wherein the multi-dimensional bitmap comprises a two-dimensional bitmap.

19. The non-transitory machine-readable storage medium of claim 16, wherein the determining the decoding rate comprises rate matching based on the multi-dimensional bitmap.

20. The apparatus of claim 2, wherein the rate matching is performed on a data packet at a decoder of the mobile device.

* * * * *